(12) United States Patent
Flynn et al.

(10) Patent No.: US 7,943,103 B2
(45) Date of Patent: May 17, 2011

(54) WASTE SOLIDS HANDLING

(75) Inventors: Harry E. Flynn, Edmond, OK (US); Leslie E. Crowder, Columbus, MS (US)

(73) Assignee: Tronox LLC, Oklahoma City, OK (US)

( * ) Notice: Subject to any disclaimer, the term of this patent is extended or adjusted under 35 U.S.C. 154(b) by 854 days.

(21) Appl. No.: 11/412,816

(22) Filed: Apr. 27, 2006

(65) Prior Publication Data
US 2007/0264178 A1 Nov. 15, 2007

(51) Int. Cl.
C01G 23/02 (2006.01)
C01G 25/04 (2006.01)
C01G 25/06 (2006.01)
C01G 27/04 (2006.01)
C22B 34/10 (2006.01)

(52) U.S. Cl. .......................................... 423/82; 423/83
(58) Field of Classification Search ................ 423/447, 423/82, 83; 502/150; 252/175
See application file for complete search history.

(56) References Cited

U.S. PATENT DOCUMENTS

| | | | | |
|---|---|---|---|---|
| 4,435,365 A * | 3/1984 | Morris | | 423/76 |
| 4,878,945 A * | 11/1989 | Raudsepp et al. | | 423/25 |
| 5,271,910 A | 12/1993 | van der Meer et al. | | |
| 5,334,362 A | 8/1994 | Schinkitz et al. | | |
| 5,494,648 A * | 2/1996 | Olsen et al. | | 423/17 |
| 5,624,490 A * | 4/1997 | Hill et al. | | 106/697 |
| 5,935,545 A | 8/1999 | Leary et al. | | |
| 6,328,938 B1 * | 12/2001 | Taylor et al. | | 423/79 |
| 6,399,033 B1 | 6/2002 | Hartmann | | |
| 6,800,260 B2 * | 10/2004 | Carter et al. | | 423/140 |
| 7,045,480 B2 * | 5/2006 | Te Nijenhuis et al. | | 502/150 |
| 7,115,157 B2 * | 10/2006 | Flynn et al. | | 95/271 |
| 2004/0136889 A1 * | 7/2004 | Bonath et al. | | 423/80 |
| 2005/0147472 A1 * | 7/2005 | Alexander | | 405/129.2 |

FOREIGN PATENT DOCUMENTS
EP 0 318 231 A1 5/1989

OTHER PUBLICATIONS

Written Opinion of the International Searching Authority—PCT/US2007/008461, mailed Oct. 27, 2008—Tronox LLC.
Text of FIrst Office Action, The State Intellectual Property Office of the People's Republic of China, Dec. 11, 2009, pp. 1-3, Chinese Patent Application No. 2007800150204, China.
International Preliminary Report on Patentability of the International Preliminary Examining Authority/US—PCT/US07/08461, mailed Nov. 9, 2009—Tronox LLC.
Communication pursuant to Article 94(3) EPC—07754900.4—European Patent Office, Apr. 28, 2009.

* cited by examiner

*Primary Examiner* — Jessica L Ward
*Assistant Examiner* — Alexander Polyansky
(74) *Attorney, Agent, or Firm* — McAfee & Taft

(57) ABSTRACT

A process is provided for handling waste solids produced from the chlorination of titanium-bearing ores in the presence of coke as a reducing agent. The process includes the steps of combining waste metal chloride solids and unreacted ore and coke solids with a liquid whereby waste metal chloride solids are dissolved in the liquid and unreacted ore and coke solids are slurried in the liquid, and separating out the unreacted ore and coke solids from the liquid. The liquid including the dissolved waste metal chlorides is then divided into a recycle substream and a bleed substream. The recycle substream is recycled such that it comprises at least a part of the liquid which is combined with the waste metal chloride solids and unreacted ore and coke solids in the product stream. The bleed substream is neutralized to produce a filterable or directly landfillable mass of waste metal hydroxide solids.

12 Claims, 1 Drawing Sheet

WASTE SOLIDS HANDLING

FIELD OF THE INVENTION

This invention relates to processes for the handling of waste solids produced from the chlorination of titanium-bearing ores, and in particular but without limitation thereto, to the handling of waste metal chloride solids such as produced in a chloride process for making pigmentary titanium dioxide.

BACKGROUND OF THE INVENTION

In the commercial manufacture of titanium tetrachloride (for example, for the production therefrom of titanium metal or of pigmentary, chloride process titanium dioxide), a titanium-bearing ore, e.g., ilmenite, slag, synthetic or natural rutile, is chlorinated in the presence of coke as a reducing agent, conventionally in a fluid bed reactor at temperatures on the order of about 1000 degrees Celsius. In addition to the desired reaction product, namely titanium tetrachloride, other impurity metal values in the ore are continuously chlorinated to produce chlorides of iron, nickel, vanadium, manganese and other metals.

Conventionally, these waste metal chlorides are carried over in the chlorinator product stream with the desired titanium tetrachloride, with "blowover" ore and coke solids and with various byproduct gases such as carbon monoxide, carbon dioxide and the like. After passing through a heat exchanger, quench or similar to cool down the chlorinator product stream, the products of the chlorination step enter into a gas/solids separator, typically in the form of a cyclone separator. Waste metal chloride solids are removed with unreacted ore and coke solids from the bottom of the cyclone separator, as "cyclone dust", "chlorinator waste solids" or similar. These chlorinator waste solids have been managed previously in a number of ways.

U.S. Pat. No. 5,271,910 to van der Meer et al. proposes leaching the cyclone dust in a hydrochloric acid-containing solution to obtain a solution containing substantially all of the impurity metal chlorides and a solids residue comprised of unreacted ore, silica and coke, performing a separation of the dissolved impurity metal chlorides and solids as by filtration, then precipitating the impurity metal chlorides as their hydroxides by neutralization, filtering to separate and recover the metal hydroxide solids and dewatering the filtercake thus obtained.

Schinkitz et al., in U.S. Pat. No. 5,334,362, describe a number of conventional approaches to the handling of chlorinator waste solids, before proposing an improvement of their own. As related by Schinkitz et al., one theretofore known process involved "pasting up and filtration" of the cyclone dust, whereby the filtrate of the suspension (chiefly being a solution of iron (II) chloride) is recoverable as a useful product for sludge conditioning in wastewater treatment and the coke-containing filtration residue or filtercake is disposed of or used as a fuel. A reported variation of this process, referenced to U.S. Pat. No. 3,655,344, involved "pasting up, neutralization and filtration" steps whereby the waste metal chlorides are converted to a water-insoluble solid metal hydroxide form and are disposable with the inert solids after filtration. The filtercake in this instance is described as "well filterable" and "non-thixotropic", in contrast to the precipitated and worked up metal hydroxides which reportedly result from the process of EP 390 293 A1, wherein the inert solids—residual unreacted ore and coke in particular—are recovered for reuse prior to precipitation of the waste metal hydroxides and the filtration of the same.

Schinkitz et al. for their part propose an improvement to the process of EP 390 293 A1 whereby the useful inerts can be separated out, yet the waste metal hydroxides precipitated out under conditions such that a "well-filterable, non-thixotropic solid material" is reportedly obtained for landfilling. The examples reveal that with the inerts not recovered as in the first, known process the solids content of the filtercake from a filterpress is 46.5%, while in the second, known variation the solids content is reduced to 26.5%. Applying Schinkitz et al's improvement to the second variation yields however solids contents ranging from 37.7% to 39.0%. Schinkitz et al. acknowledge this difference, but point to reduced landfilling requirements overall by omitting the inert ore and coke solids from the filtercake and to improved economics through the recyclability or product value generally of the recovered inert solids fraction as more than offsetting the reduction in the achievable solids content of the filtercake.

U.S. Pat. No. 5,935,545 to Leary et al. quenches and slurries the cyclone dust with water, forming a cyclone underflow slurry of dissolved metal chlorides including most of the impurity metal chlorides, ore, coke and gangue solids. Hydrocyclone separators are suggested for recovering some of the ore which is recycled to the chlorinator. Ferric chloride and some other lower boiling metal chlorides are carried in the cyclone overflow, cooled and precipitated out, then separated out by any suitable gas-solid separation device.

U.S. Pat. No. 6,399,033 B1 to Hartmann (commonly-assigned with U.S. Pat. No. 5,334,362) utilizes a hydrocyclone to separate out a slurry of the cyclone dust solids into a titanium dioxide (ore)-rich underflow fraction and a coke and silica-rich overflow fraction, the overflow fraction being filtered in a belt filter or filter press to produce solids useful as a fuel and a filtrate suitable again for sludge conditioning in wastewater treatment. The underflow is likewise filtered in a belt filter or filter press, and the filtercake is dried and ground for recycle to the chlorinator while the filtrate is suggested for use in chemical treatment of wastewaters. By using a hydrocyclone on the cyclone dust then drying and grinding the solids in the hydrocyclone underflow, buildup of silica in the chlorinator bed is avoided from silica carried through in the cyclone dust.

SUMMARY OF THE PRESENT INVENTION

The present invention in one aspect concerns an improved method for the handling of waste solids produced from the chlorination of titanium-bearing ores in the presence of coke as a reducing agent, and in a preferred aspect concerns the handling of waste metal chloride solids produced in a chloride process for making pigmentary titanium dioxide. According to the improved, inventive method, solids present in the product stream from the chlorinator, including waste metal chloride solids and unreacted ore and coke solids, are cooled and then separated from gaseous components of the product stream. The waste solids are then combined with a liquid whereby the waste metal chloride solids are dissolved in the liquid and unreacted ore and coke solids are slurried in the liquid. The unreacted ore and coke solids are then separated out from the slurry, and the remaining liquid in which waste metal chlorides are dissolved is divided into a recycle portion and a bleed portion. The recycle portion forms at least a part of the liquid which is combined with the waste solids originally, and the bleed portion is neutralized to produce a filterable mass of waste metal hydroxide solids. In one embodiment, the filterable mass of waste metal hydroxide solids is in fact then filtered to produce a landfillable waste metal hydroxide solids mass, while in another embodiment, a directly landfillable waste metal hydroxide solids mass is achieved on neutralizing the bleed portion and the mass is accordingly disposed of by landfilling without the necessity of first being filtered.

DETAILED DESCRIPTION OF PREFERRED EMBODIMENTS OF THE INVENTION

Figure 1:
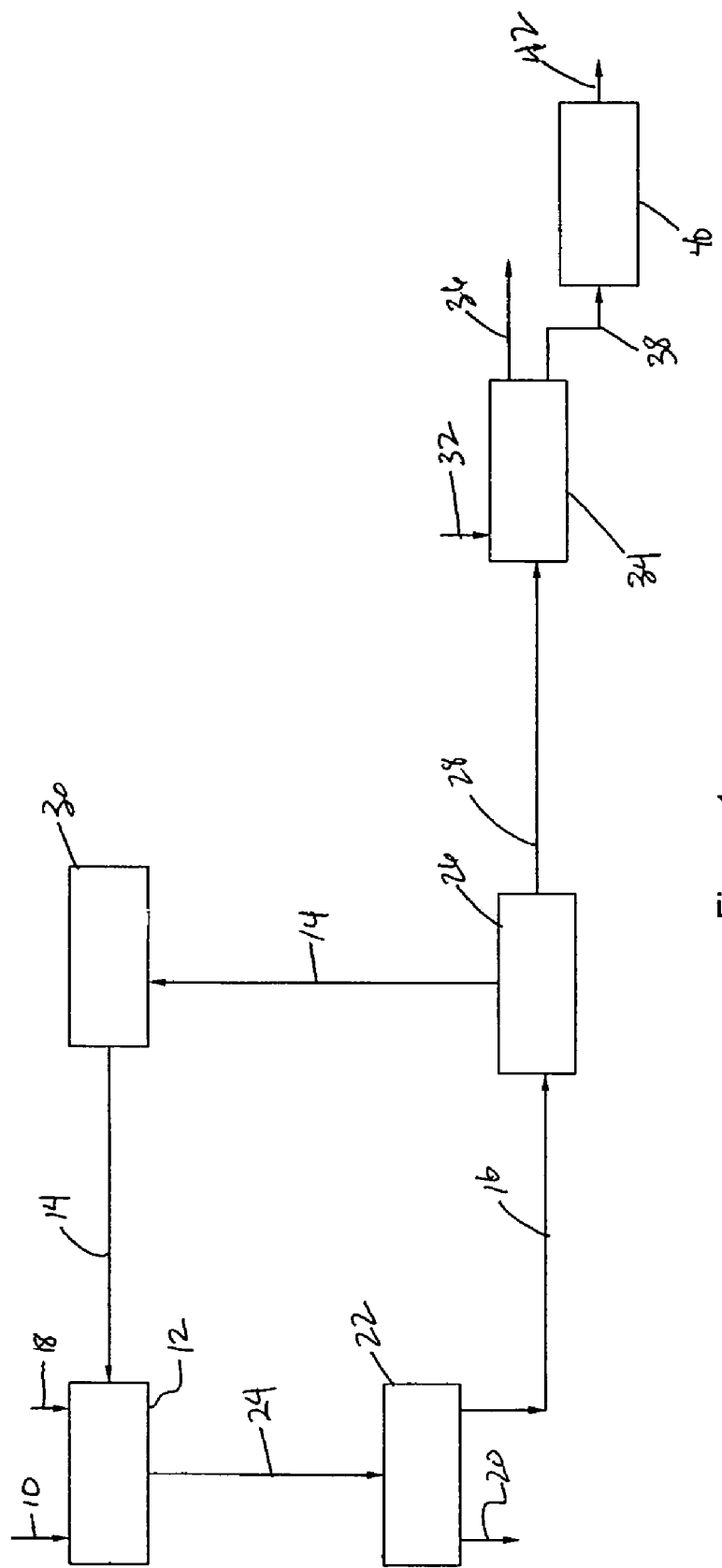
FIG. 1 is a schematic of the process of the present invention in a preferred embodiment.

The improvements provided by the present invention stem from the discovery that, by recycling a portion of the dissolved waste metal chloride-containing liquid and using it for at least part of the liquid added to the waste solids in a chlorinator sump/suspension vessel (as in U.S. Pat. No. 6,399,033)/quenching tank (as in U.S. Pat. No. 5,935,545), rather than just using water as the liquid as shown in U.S. Pat. Nos. 6,399,033 and 5,935,545, for example, a liquid portion can be produced with a sufficiently high concentration of the dissolved metal chlorides such that on subsequent neutralization a much higher solids content can be achieved even in the absence of the unreacted ore and coke solids (compare Schinkitz et al, U.S. Pat. No. 5,334,362 and EP 390 293 A1 discussed therein).

Where a sufficient recycle loop is established, in fact, to highly concentrate the dissolved waste metal chlorides, the percent of neutralized waste metal hydroxides in the bleed portion after it has been neutralized can be such that the solids are on the order of 45 percent by weight or greater and the mass of neutralized waste metal hydroxides is suitable for being directly landfilled. In this manner, costly thickeners, filter presses and the like are avoided. Further, in the context of U.S. Pat. Nos. 5,935,545 and 6,399,033, the use of a recycle portion of water metal chloride-containing liquid rather than water in the suspension vessel or quenching tank, respectfully, provides benefits in reducing the liquid loading on downstream processing, storage and transportation in these processes, for example, as related to the production, storage and transportation of streams 19 and 20 in U.S. Pat. No. 6,399,033. Finally, even where the dissolved waste metal chlorides are not recycled and concentrated in the process to an extent whereby a directly landfillable waste metal hydroxide mass results, nevertheless it has been discovered that a sufficient improvement can be made such that no pre-thickening is required (as would otherwise be true) in order to filter the wastes through a recessed plate, membrane squeeze, candle or other conventional filtration device and achieve a waste that is then suitable for being landfilled. In a still further related aspect, the use of dry materials for neutralizing the dissolved waste metal chlorides—for example, using dry lime or dry lime in combination with one or more of cement kiln dust, lime kiln dust and fly ash from coal-fired power plants, rather than a slaked lime slurry—provides a solution that is more readily and quickly filtered and a higher solids content filter cake, with reduced hydraulic loading of the filters in addition.

Turning now to FIG. 1, the process of the present invention is schematically illustrated in a preferred embodiment. Chlorinator waste solids from a gas/solid separator (not shown), for example, a cyclone, are provided via stream 10 to a chlorinator sump or suspension vessel 12. A recycle portion 14 of an aqueous waste metal chloride solution 16 is combined with the chlorinator waste solids 10 and with makeup water 18 in the vessel 12, with the recycle portion 14 being of such a volume in relation to the makeup water 18 such that the soluble waste metal chlorides contained in the chlorinator waste solids stream 10 are substantially all dissolved into an aqueous solution but the aqueous solution is maintained very concentrated in the waste metal chlorides. Preferably, the specific gravity of the aqueous metal chloride solution 16 remaining after unreacted ore and coke solids 20 are separated out in a solid/liquid separation apparatus 22 (which may be a hydrocyclone, a filtration device or a combination of a hydrocyclone and filter) will be at least about 1.07, but more preferably will approach a specific gravity corresponding to the solubility limit of the waste metal chlorides, for example, about 1.28 at temperatures of about 20 degrees Celsius.

The slurried unreacted ore and coke solids and concentrated dissolved waste metal chlorides are conveyed from the vessel 12 to the solid/liquid separation apparatus 22 as stream 24. By means of the solid/liquid separation apparatus 22, preferably substantially all of the unreacted ore and coke solids are recovered in stream 20 and these may then be recycled to the chlorinator (not shown) in the manner of U.S. Pat. Nos. 5,935,545 or 6,399,033, for example, or used as fuel. The aqueous waste metal chloride solution 16 is then divided by a flow splitter 26 into a recycle portion 14 and a bleed portion 28, with the recycle portion 14 preferably being cooled in a heat exchanger 30 prior to being added back into the vessel 12.

Bleed portion 28 is then neutralized by mixing with one or more dry or solid materials, as suggested by stream 32 to mixing vessel 34. Dry lime may be used alone, but because of its comparatively greater cost preferably dry lime is used in combination with one or more other materials, for example, cement kiln dust (CKD), lime kiln dust (LKD) and fly ash from coal-fired power plants. Where either or both of CKD and LKD are used with the dry lime, preferably the CKD and/or LKD is used in a first step to bring the solution's pH to about 4.5, then the dry lime is applied to raise the solution's PH to about 8.5. Where fly ash is used in combination with the dry lime, these materials can be applied sequentially as just described, or simply as a mixture in a single stream 32. The cement kiln dust, lime kiln dust and the fly ash from coal-fired power plants are all commercially-available materials, from companies such as Holcim Ltd. (Zurich) and LaFarge Group (Paris) in regard to CKD, from Graymont Inc. (Richmond, British Columbia, Canada) or Greer Lime Company (Riverton, W. Va.) as to LKD and as to the fly ash from any of a number of coal-fired power plants.

As a consequence of the neutralization step, the dissolved waste metal chlorides in bleed portion 28 are preferably substantially completely precipitated out as a waste metal hydroxide mass suitable for direct landfilling (suggested by flow arrow 36), or a waste metal hydroxide slurry is produced (stream 38) that requires no pre-thickening and which can be effectively and economically filtered in a filter 40 for producing a landfillable waste metal hydroxide mass (stream 42) and a filtrate (not shown) that can be conventionally used, e.g., as chemical reagents for water treatment, as in U.S. Pat. Nos. 5,935,545 or 6,399,033.

ILLUSTRATIVE EXAMPLES

The present invention is illustrated more particularly by the following examples.

Example 1

An aqueous solution was made from waste metal chlorides from the chlorinator in a chloride process pigmentary titanium dioxide manufacturing plant, having a specific gravity of 1.28. One hundred grams of this solution was neutralized to a pH of 9 with 19.6 grams of dry lime. The resulting precipitate comprised 45 percent by weight of the combined liquid and waste metal hydroxide solids, a sufficiently high solids content to be considered directly landfillable and a figure comparable to the performance of a conventional recessed plate filter operating at 165 to 225 psig.

Examples 2 through 7

For example 2, an aqueous solution was made from the waste metal chlorides from the chlorinator in a chloride process pigmentary titanium dioxide manufacturing plant, having a specific gravity of 1.07. This solution was neutralized with slaked lime slurry and then filtered in a membrane squeeze filter operating at 225 psig. This test was then replicated in Examples 3 through 7, noting in each case the required filtration time and the percent solids in the filter cake. Results are as shown in Table 1:

TABLE 1

| Example | Filtration Time, Total in Minutes (Combined feed, squeeze time) | Cake Solids Pct. |
| --- | --- | --- |
| 2 | 45 | 50.15 |
| 3 | 56 | 46.84 |
| 4 | 55 | 47.44 |
| 5 | 55 | 45.49 |
| 6 | 50 | 48.40 |
| 7 | 50 | 51.63 |
| Average: | 51.83 | 48.33 |

Examples 8 through 10

For Examples 8 through 10, the same 1.07 specific gravity solution was prepared, but neutralized (before being filtered in the same manner as Examples 2 through 7) with dry lime rather than a slaked like slurry. Results are shown in Table 2:

TABLE 2

| Example | Filtration Time, in Minutes | Cake Solids Pct. |
| --- | --- | --- |
| 8 | 37 | 55.51 |
| 9 | 47 | 55.76 |
| 10 | 35 | 56.16 |
| Average: | 40 | 55.81 |

As will be seen from a comparison of Tables 1 and 2, an improvement in both the average filtration time (56 minutes approximately to 40 minutes) and in the percent solids in the filtercake (48 percent approximately to almost 56 percent) was observed in the use of dry lime, rather than of a slaked lime slurry, in neutralization. Consequently, neutralization by the use of dry lime is preferred over use of the slaked lime slurry.

What is claimed is:

1. A process for handling waste solids produced from the chlorination of titanium-bearing ores in the presence of coke as a reducing agent, comprising:
    cooling a product stream from said chlorination of titanium-bearing ores which includes waste metal chloride solids and unreacted ore and coke solids;
    separating waste metal chloride solids and unreacted ore and coke solids from gaseous components of the product stream;
    combining the waste metal chloride solids and unreacted ore and coke solids with a liquid whereby waste metal chloride solids are dissolved in the liquid and unreacted ore and coke solids are slurried in the liquid;
    separating out unreacted ore and coke solids from the liquid including the dissolved waste metal chlorides;
    after separating out unreacted ore and coke solids from the liquid, dividing the liquid including the dissolved waste metal chlorides into a recycle substream or portion and a bleed substream or portion, the recycle substream or a portion of the recycle substream and the bleed substream or a portion of the bleed substream having a specific gravity of at least about 1.07;
    recycling the recycle substream or portion to comprise at least a part of the liquid which is combined with the waste metal chloride solids and unreacted ore and coke solids in the product stream; and
    neutralizing the bleed substream or portion to produce a filterable mass of waste metal hydroxide solids.

2. A process as defined in claim 1, further comprising filtering the filterable mass of waste metal hydroxide solids to produce a landfillable waste metal hydroxide solids mass.

3. A process as defined in claim 1, wherein the filterable mass of waste metal hydroxide solids is characterized by a solids content high enough to allow the filterable mass of waste metal hydroxide solids to be direct landfilled without being filtered.

4. A process as defined in claim 3, wherein the solids content of the filterable mass is at least 45 percent by weight.

5. A process as defined in claim 1, wherein the recycle substream or portion is characterized by a specific gravity of about 1.28 at about 20 degrees Celsius.

6. A process as defined in claim 1, wherein the dissolved waste metal chlorides are neutralized by mixing with one or more solids including dry lime.

7. A process as defined in claim 6, wherein the dissolved waste metal chlorides are neutralized by mixing first with one or more of cement kiln dust, lime kiln dust or fly ash, then mixing in dry lime.

8. A process as defined in claim 6, wherein the dissolved waste metal chlorides are neutralized in one step with mixing of the dry lime and with fly ash.

9. A process as defined in claim 1, wherein the waste metal chloride solids and unreacted ore and coke solids are separated from gaseous components of the product stream in a cyclone separator.

10. A process as defined in claim 9, wherein the step of separating out unreacted ore and coke solids from the liquid including the dissolved waste metal chlorides employs at least a hydrocyclone.

11. A process as defined in claim 10, wherein the unreacted ore and coke solids separated out at least in part by means of a hydrocyclone are recycled back to the chlorination step.

12. A process as defined in claim 3, further comprising the step of disposing the filterable mass of waste metal hydroxide solids produced by the neutralization step in a landfill without first filtering the filterable mass of waste metal hydroxide solids.

* * * * *